April 19, 1960   R. G. MALLON   2,933,441
PROCESS OF MAKING RUBBER ARTICLES
Filed Oct. 14, 1957

INVENTOR
R. G. Mallon
BY Rockwell & Bartholow
ATTORNEYS

United States Patent Office 2,933,441
Patented Apr. 19, 1960

2,933,441

PROCESS OF MAKING RUBBER ARTICLES

Richard G. Mallon, Milford, Conn., assignor to Astra, Incorporated, Milford, Conn., a corporation of Connecticut Application October 14, 1957, Serial No. 689,855

2 Claims. (Cl. 204—154)

This invention relates to a process of making rubber articles, and more particularly to the manufacture of rubber articles in which different parts of a given article have different physical characteristics. An example of such an article is a pneumatic tire such as used on motor cars, in which the tread of the tire which is subject to hard use on abrasive surfaces has different qualities from the remainder of the casing or tire carcass. Moreover, my invention deals especially with a process where, in such an article, the rubber is cured and wherein a novel method of curing the article is desirable.

One of the objects of the invention is to improve the article, and, in the case of a pneumatic tire, to make the tread portion of the tire more resistant to wear.

A further purpose is to provide an improved product, a part only of which is subject to hard wear, by improving the qualities of this part to a notable degree while at the same time the expense of making the complete article is reduced.

Another object is to improve the procedure from the standpoint of expense and the length of time required to make the article.

Another purpose of the invention is to furnish a process characterized by a two-part or two-stage cure of the product whereby beneficial results are secured in comparison to the procedure now employed.

To these and other ends the invention consists in the novel features and combinations thereof to be hereinafter described and pointed out in the claims.

Figure 1:
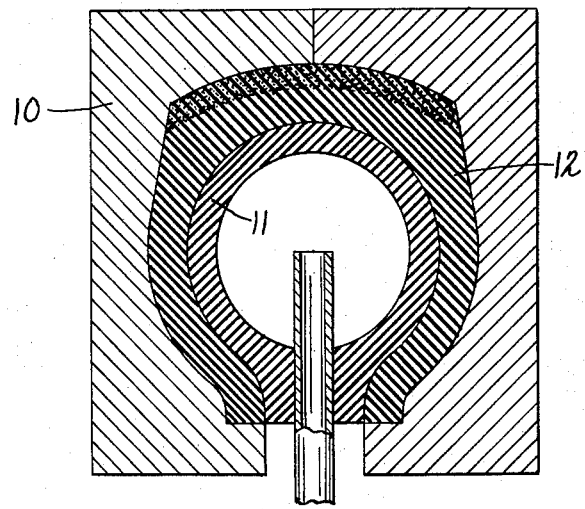
Figure 2:
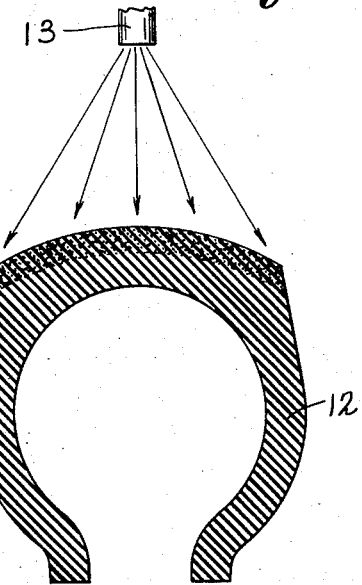

In the accompanying drawing:

Fig. 1 is a somewhat diagrammatic sectional view of a tire mold in which a pneumatic tire is being molded; and Fig. 2 is a diagrammatic view showing the tire casing, after removal from the mold, being subjected to ionizing radiation at the tread portion of the tire.

As regards the article to be produced, which is one having a part or portion only which in use is subject to hard wear, a pneumatic automobile tire may be taken as an example. In the manufacture of rubber automotive tires, the tendency of the present practice is toward a vulcanization or curing step of minimum duration. The rubber to be cured contains sulphur and one or more chemical accelerators, the latter being used to speed up the curing to a notable degree. The result of the speed-up has been, however, that the article has definite disadvantages, such as reduced shelf life, reduced durability, and deficient wear resistance. On the other hand if less of the curing agent is used the tire must remain in the mold a relatively long time. One aim of the present invention is to overcome these disadvantages. According to this invention, the casing or carcass of the tire, instead of comprising a single rubber composition or batch so that all parts of the article are of identical composition, comprises two different rubber compositions, one of which is the body or main carcass portion and the other of which is the tread portion. An uncured tire formed in this way is cured by heat treatment in a mold which may be of the type customarily used, but the heat treatment involves separate treatment of the body and tread portions, as hereinafter described, which treatment is adapted to the chemical make-up of the respective tire portions, and in the case of the tread portions involves a curing step effected by ionizing radiation.

The following is an example of the procedure in making a tire but the invention is applicable to other products of rubber or rubberlike curable material.

Two compositions of rubber, natural or synthetic or combinations thereof, are prepared. One of these compositions contains sulphur and accelerator, the amounts of which are in accordance with present practice in making a complete tire. This composition is used for making the body portion of the casing. The other composition is one containing a relatively small amount or proportion of sulphur, and in this particular example no accelerator. The tire is formed into a body of uncured rubber in which the tread portion is laid over and carried by the body portion. The body portion may be of usual form and structure, containing tire cord and/or other reinforcement. The compositions will, or may, as usual contain ingredients in addition to rubber and curing agent.

The next step is to place this article in a mold, which may be of a kind customarily used, and in molding the tire the customary air bag may be used. After assembly in the mold of the incomplete tire and the air bag, the mold is subjected to heat for curing. The arrangement of the parts in the mold may be as shown in Fig. 1, where the mold is indicated at 10, the air bag at 11, and the rubber tire at 12. The tread portion of the tire is indicated by stippling. The heat treatment in the mold is continued to the point where the cure of the body portion (as distinguished from the tread portion) is complete, the body portion having set. At this point the tire is removed from the mold and given additional treatment for curing the tread portion. This treatment of the tread portion is effected by ionizing radiation, using, for example, an electron gun, indicated at 13 in Fig. 2. The electron gun may be first employed in the manner shown in Fig. 2 so as to be directed against the tire in the plane of the tire and to send its rays into the tread portion. The depth of penetration of the tread portion by this treatment may be, for example, one half inch. After this treatment there may be, if desirable, further use of the gun for the purpose of uniform curing of the tread portion in all parts.

The radiation of the tread portion is intense and preferably localized so that the tread portion only is treated. A beam of high-energy electrons is preferred for this treatment. Other rays, such as X-rays or gamma rays, may be used for this purpose. The result is to give the tread portion the superior properties of radiation-cured rubber. The radiation of the tread portion is continued until the latter is fully cured, and the tire is then ready for sale and use.

As a variation of the foregoing example, the composition for the tread portion may include a small amount of accelerator in addition to the sulphur content.

From the foregoing it will be understood that in the heat treatment of the tire in the mold, the tread portion will be cured to a limited extent. Therefore, when the tire is removed from the mold the tread portion will hold its form so that the tire will be removable as a unit without difficulty. Furthermore, the cure given to the tread portion in the mold serves to maintain the shape of the tread portion when the tire is handled and given the radiation treatment.

In curing the tread portion by radiation in the manner mentioned, the penetration can be of relatively small depth, as indicated above, and therefore the expense entailed by this treatment is materially less than it would be otherwise.

As the wear of the tire is principally on the tread and not on the body portion, it may be feasible to give the body portion a mold cure of shorter duration than the cure in the mold ordinarily given in the usual molding practice.

In subjecting the tread portion to radiation, the electron gun may be oscillated so as to avoid undue concentration of the beam, and the application of the beam or beams may be varied in different ways as required by the conditions in a given case.

The batches used for making articles may vary chemically and otherwise, and the time required for the radiation step will not only depend on the intensity and voltage but upon the thickness of the rubber article and other conditions.

From the foregoing it will be seen that as far as the product (tire or other article) is concerned, the same is improved because the part which is subjected to hard wear, i.e. abrasion, has the superior properties of radiation-cured rubber. The improvement in the tread portion takes place, moreover, without any sacrifice of the quality of the remaining portion of the article. Moreover, as regards the article as a whole and its respective parts of different composition, there is improvement in shelf life and durability as well as wear resistance and other qualities. By the practice of this process, the manufacturing cost is reduced because of the reduction of the time during which the articles remain in the mold. Not only are the molds expensive in themselves, but the heat treatment in the molds is expensive. The greater the production that can be obtained from one mold in a unit of time, the more economical is the process. It is believed to be apparent that the improvements in the process and in the article sought as objects of the invention are realized by the procedure above described.

It has been clearly indicated that the invention is applicable to various articles other than tires, and it is to be understood that the invention is applicable to the manufacture of articles from various rubberlike curable materials.

In addition to the improvement in wear resistance in an article made up of two or more different curable compositions, there are other important advantages, as pointed out above, and there is a further advantage by reason of the fact that the article offers maximum resistance to deterioration when subjected to high temperatures.

Various changes and modifications may be made without departure from the principles of the invention and the scope of the claims.

What I claim is:

1. The process of making an inflatable rubber tire, said process comprising preparation of rubber batches or compositions the first of which contains a certain proportion of sulphur and a certain proportion of accelerator and the second of which contains a lower proportion of sulphur and a lower proportion of accelerator, forming the article from such compositions so that the second batch portion is a tread portion joined to a side wall first portion, heating the article in a mold to effect a complete cure of the side wall portion and a partial cure only of the tread portion, and then after the article has been removed from the mold directing ionizing rays against said tread portion to give it a full cure.

2. The process of making an inflatable rubber tire, said process comprising the preparation of rubber batches or compositions the first of which contains sulphur and accelerator for curing by heating and the second of which contains a curing component insufficient fully to cure the respective portion by such heating, forming the article from such compositions so that the second batch portion is a tread portion joined to a side wall first portion, heating the article in a mold to effect a complete cure of said first portion and a partial cure only of said second portion, and then after the article has been removed from the mold directing ionizing rays against said second portion to give it a full cure.

References Cited in the file of this patent

UNITED STATES PATENTS

| | | |
|---|---|---|
| 1,161,966 | Price | Nov. 30, 1915 |
| 1,394,928 | Midgley et al. | Oct. 25, 1921 |
| 1,906,402 | Newton | May 2, 1933 |
| 2,080,948 | Mazoyer et al. | May 18, 1937 |
| 2,763,609 | Lewis et al. | Sept. 18, 1956 |

OTHER REFERENCES

"New Method of Vulcanizing Rubber," October 1953.
"Rubber Vulcanized by Atomic Radiation Alone," Science News Letter, June 5, 1954, page 365.